(12) United States Patent
Liao et al.

(10) Patent No.: US 7,396,016 B2
(45) Date of Patent: Jul. 8, 2008

(54) SEALING DEVICE

(75) Inventors: Chih-Wei Liao, Nantou (TW);
Chiang-Ling Chien, Nantou County (TW); Fu-Chih Huang, Nantou (TW)

(73) Assignee: Nak Sealing Technologies Corporation, Nantou (TW)

( * ) Notice: Subject to any disclaimer, the term of this patent is extended or adjusted under 35 U.S.C. 154(b) by 50 days.

(21) Appl. No.: 11/235,316

(22) Filed: Sep. 27, 2005

(65) Prior Publication Data

US 2007/0069479 A1 Mar. 29, 2007

(51) Int. Cl.
*F16J 15/02* (2006.01)
(52) U.S. Cl. .................. 277/353; 277/576; 277/551; 277/558; 277/572
(58) Field of Classification Search .......... 277/349, 277/353, 549, 551, 558, 572–573, 576–577
See application file for complete search history.

(56) References Cited

U.S. PATENT DOCUMENTS

| 3,275,333 A | * | 9/1966 | Scott et al. ............... 277/565 |
| 3,510,138 A | * | 5/1970 | Bowen et al. ............. 277/571 |
| 3,561,770 A | * | 2/1971 | Corsi et al. ............... 277/562 |
| 3,682,488 A | * | 8/1972 | Matsushima ............. 277/551 |
| 4,350,347 A | * | 9/1982 | Heinrich ................. 277/549 |
| 4,447,064 A | * | 5/1984 | Ehrmann et al. .......... 277/559 |
| 4,856,794 A | * | 8/1989 | Boyers et al. ............. 277/571 |
| 5,002,289 A | * | 3/1991 | Yasui et al. .............. 277/559 |
| 5,201,528 A | * | 4/1993 | Upper .................... 277/394 |
| 5,511,886 A | * | 4/1996 | Sink ..................... 384/486 |

* cited by examiner

*Primary Examiner*—Vishal Patel
(74) *Attorney, Agent, or Firm*—Bacon & Thomas, PLLC (57) ABSTRACT

A sealing device includes an inner race, an outer race capped on and rotatable relatively to the inner race, a rubber oil seal mounted between the inner race and the outer race, a lubricating oil received between the inner race and the outer race, radiation holes formed in the outer race, and a spoiler provided between the inner race and the outer race for causing convection of the lubricating oil to lower the temperature of the lubricating oil upon rotation of the outer race relatively to the inner race.

7 Claims, 10 Drawing Sheets

FIG. 10

SEALING DEVICE

BACKGROUND OF THE INVENTION

1. Field of the Invention

The present invention relates to a sealing device for mechanical parts, and more particularly to a sealing device, which is comprised of an inner race, an outer race capped on and rotatable relatively to the inner race, and a rubber oil seal mounted in between the inner race and the outer race.

2. Description of the Related Art

In machinery, sealing devices are used in parts of transmission (rotary) mechanisms, such as rotary shafts, for protection against outside dust and prevention of leakage of internal lubricating oil. To achieve a satisfactory sealing effect, elastic rubber is commonly used as the major part of the sealing device. The functioning of the elastic rubber determines the sealing effect of the sealing device. It is known that temperature is one of the major factors that cause the deterioration of the elastic rubber. A high working temperature accelerates aging of the elastic rubber. Friction between the parts, radiation of sunlight, and temperature change of lubricating oil cause the elastic rubber to deteriorate. Therefore, the ambient temperature has a great concern with the service life of the elastic rubber. It is a practical way to prolong the service life of a sealing device by preventing increase of the working temperature.

SUMMARY OF THE INVENTION

The present invention has been accomplished under the circumstances in view. It is one object of the present invention to provide a sealing device, which effectively lowers oil temperature to further extend the service life of the rubber seal. It is another object of the present invention to provide a sealing device, which has a curved space at one side thereof for accommodating a lubricating grease to protect the inside space against outside dust.

To achieve the foregoing objects of the present invention, the sealing device is comprised of an inner race, an outer race, an oil seal, an oil passage, and a spoiler structure. The inner race is a circular frame having a top race face and a bottom race face, capped on the inner race and rotatable relatively to the inner race. The outer race is a circular frame having an inner race face, an outer race face, and two inner surfaces. The oil seal is fastened to the inner race, having a main lip, which has a ridge, a front surface, and a back surface. The oil seal is forced by a radial pressure to press the ridge thereof against the inner race face of the outer race. The oil passage is defined by the top race face of the inner race, the inner race face of the outer race, one inner surface of the outer race, and the oil seal for receiving oil. Further, the outer race includes a plurality of radiation holes in communication with the oil passage and outside of the outer race. The spoiler structure is formed on a front surface of the oil seal, facing the oil passage for causing the oil to generate convection upon rotation of the outer race relatively to the inner race.

DETAILED DESCRIPTION OF THE INVENTION

Figure 1:
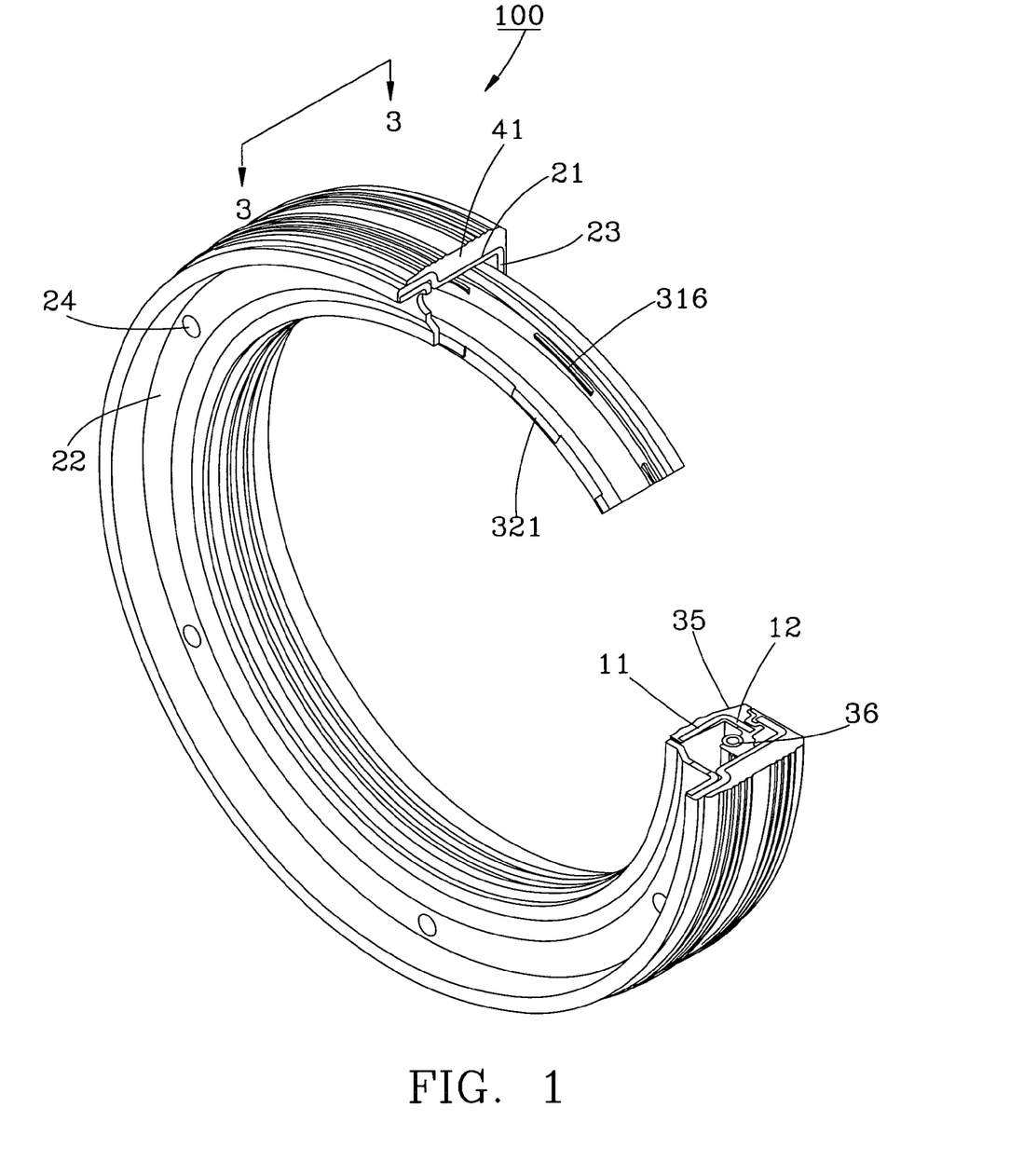
FIG. 1 is a perspective sectional view of a first preferred embodiment of the present invention.
Figure 2:
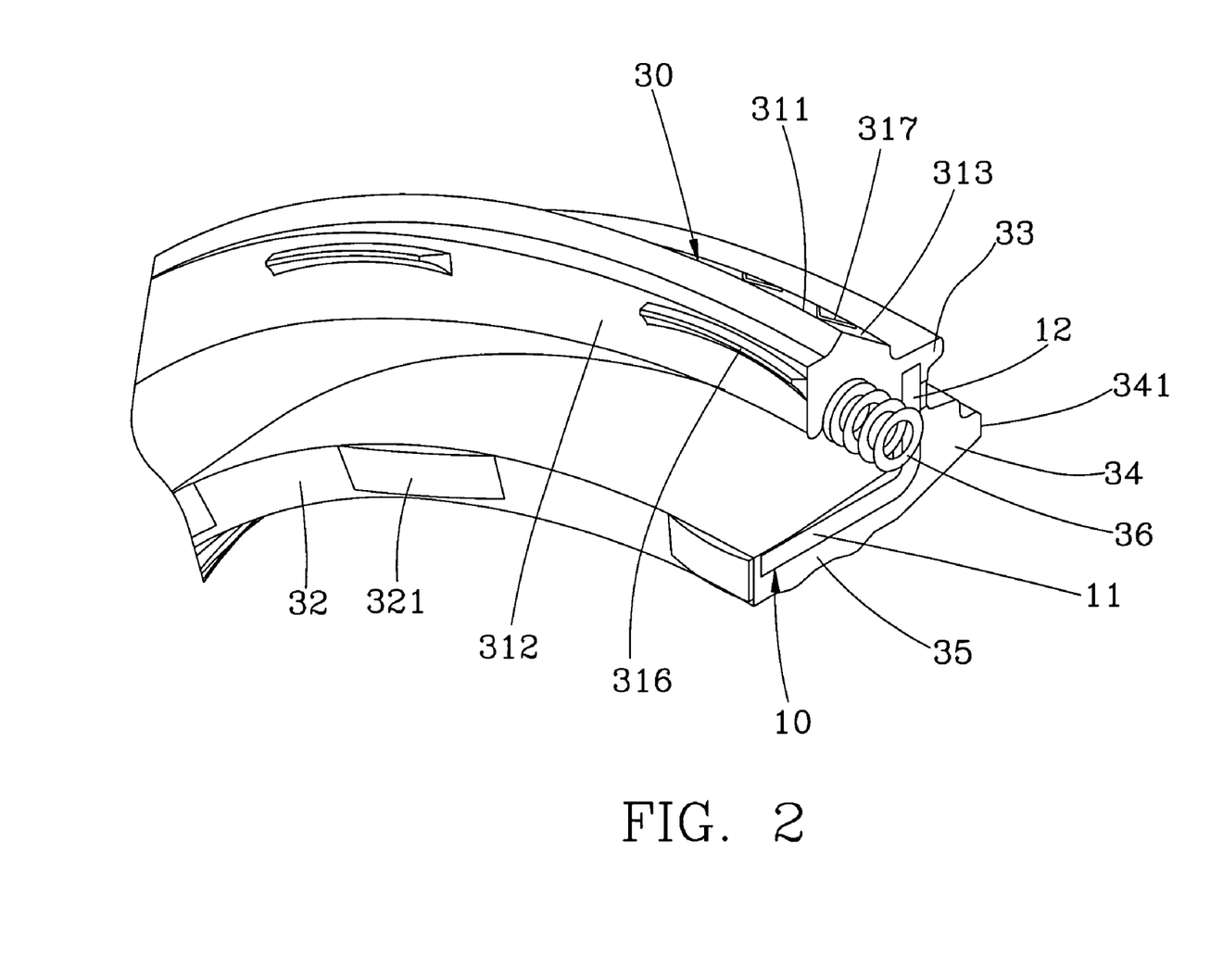
FIG. 2 is a partial sectional view of the preferred embodiment of the present invention.
Figure 3:
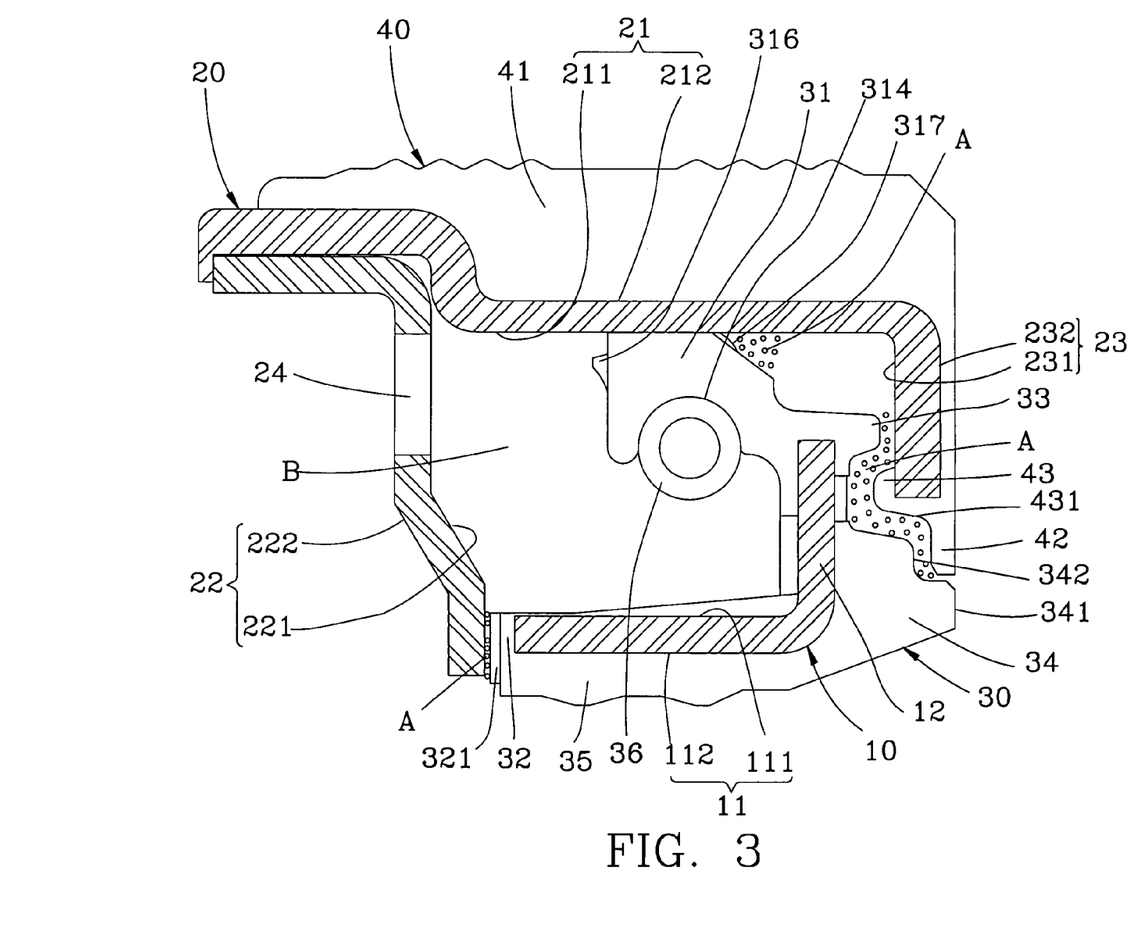
FIG. 3 is an enlarged sectional view taken along a line 3-3 indicated in FIG. 1.

Referring to FIGS. 1-3, a sealing device 100 in accordance with the present invention is shown comprised of an inner race 10, an outer race 20, an inner oil seal 30, a compression spring 36, and an outer oil seal 40.

The inner race 10 is a circular metallic frame includes a face panel 11 and a side panel 12. The face panel 11 has a top race face 111 and a bottom race face 112. The side panel 12 is connected to a side of the face panel 11, having a free end radially outwardly extending from the face panel 11.

The outer race 20 includes a face panel 21, a front blocking panel 22, and a rear blocking panel 23. The face panel 21 and the front blocking panel 22 are formed of a bent metallic plate-like member. The front blocking panel 22 is a circular metal frame. As shown in FIG. 3, the face panel 21 has an inner race face 211 and an outer race face 212. Each of the front blocking panel 22 and the rear blocking panel 23 has a free end extending radially inwardly from the face panel 21, an inner surface 221(231), and an outer surface 222(232). The inner surfaces 221 and 231 of the front and rear blocking panels 22 and 23 face each other. The front blocking panel 22 has a plurality of radiation holes 24 running through the inner surface 221 and the outer surface 222 and spaced from one another at an equal pitch. The outer race 20 is capped on the inner race 10 and rotatable relatively to the inner race 10.

Figure 4:
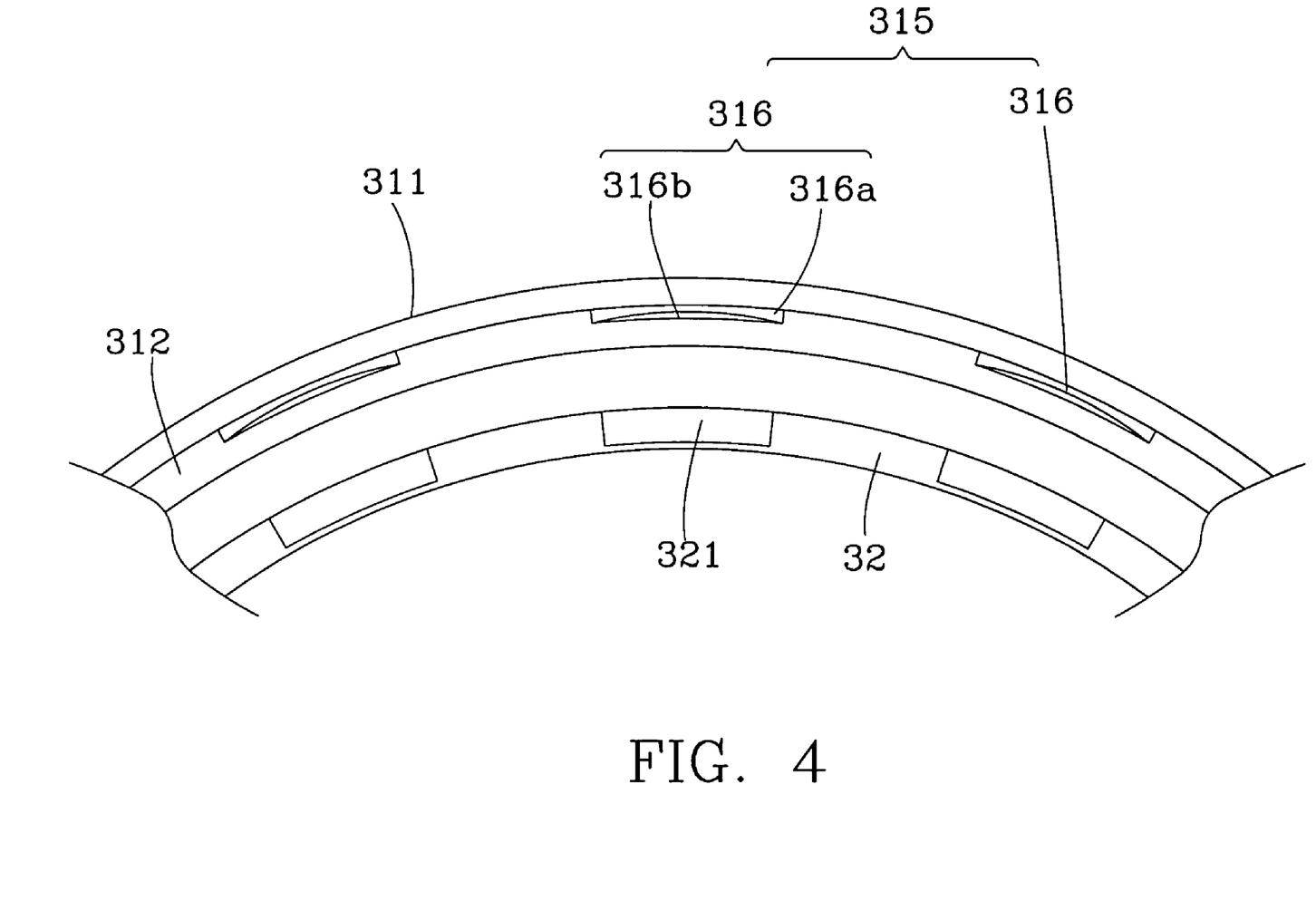
FIG. 4 is a sectional front view of the preferred embodiment of the present invention.
Figure 5:
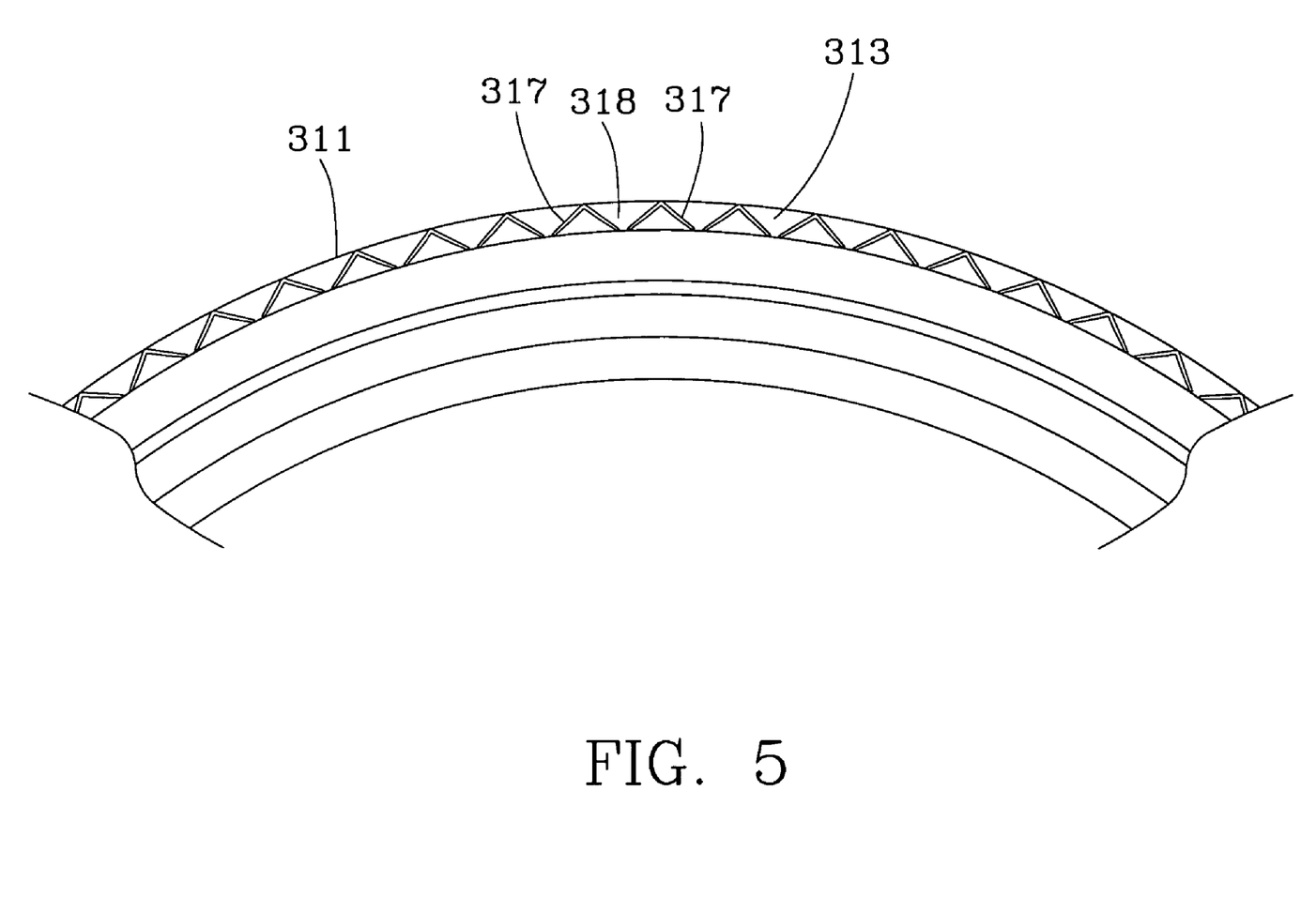
FIG. 5 is a sectional rear view of the preferred embodiment of the present invention.
Figure 6:
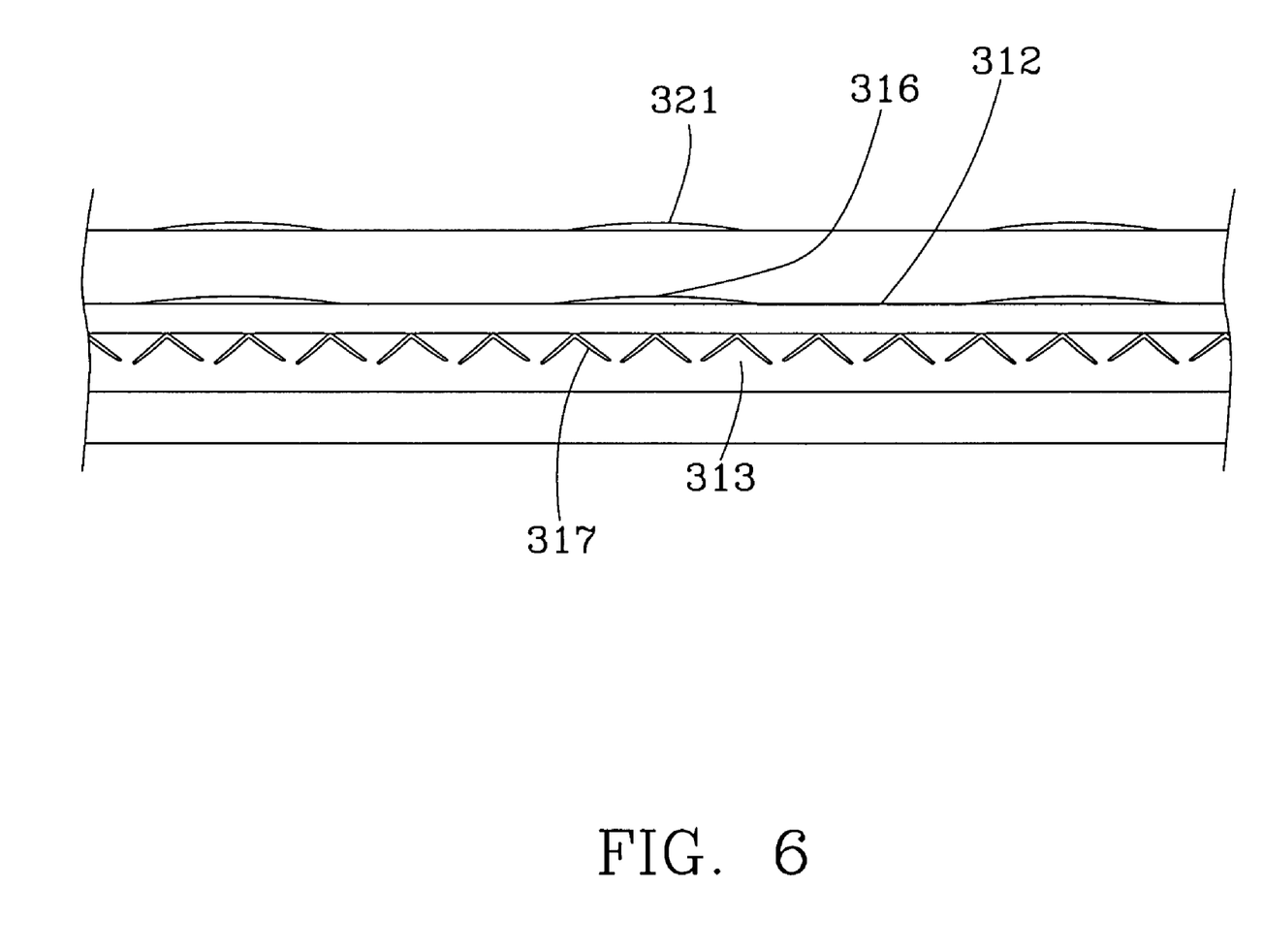
FIG. 6 is a sectional side view of the preferred embodiment of the present invention.

The inner oil seal 30 is made of rubber and covered on the face panel 11 and the side panel 12 over an outside wall of the inner race 10, including a main lip 31, a front lip 32, a rear lip 33, an extension lip 34, and an inner base sealing layer 35. Referring to FIGS. 4-6, the main lip 31 includes a ridge 311 protruding toward the face panel 21 of the outer race 20. The ridge 311 has a front surface 312 and a back surface 313, a spring groove 314 formed at a side of the main lip 31 opposite to the ridge 311 (see FIG. 3), a spoiler 315 formed of a plurality of narrow ribs 316, each of which protrudes from the front surface 312 and has a convex surface 316a, a tangent surface 316b, a plurality of double-bevel ribs 317 protruded from the back surface 313 adjacent to the peak of the ridge 311, and a plurality of oil groove 318 defined in the back surface 313 between each two adjacent double-bevel ribs 317. The compression spring 36 is mounted in the spring groove 314 inside the main lip 31 to generate a radial pressure to force the ridge 311 of the main lip 31 to contact against the inner race face 211 of the outer race 20.

The front lip 32 extends toward the front blocking panel 22, having a plurality of raised portions 321 arranged at an interval.

The rear lip 33 is located at the free end of the side panel 12 of the inner race 10, extending toward the rear blocking panel 23 to abut the inner surface 231 of the rear blocking panel 23.

The extension lip 34 is located outside the connection area between the face panel 11 and side panel 12 of the inner race 10, having a protruding portion 341 extending toward the rear blocking panel 23. A curved surface 342 is defined between the rear lip 33 and the extension lip 34.

The inner base sealing layer 35 is attached to the bottom race face 112 of the face panel 11 of the inner race 10, having a thickness and a corrugated outer surface.

The outer oil seal 40 is made of rubber, including an outer base sealing layer 41, a stop lip 42, and a protruding lip 43.

The base sealing layer 41 is attached to the outer race face 212 of the face panel 21 of the outer race 20, having a larger thickness than that of the base sealing layer 35 of the inner oil seal 30 and a corrugated outer surface.

The stop lip 42 is attached to the free end of the rear blocking panel 23 of the outer race 20, extending toward the extension lip 34 to abut the protruding portion 341.

The protruding lip 43 is attached to the free end of the rear blocking panel 23 of the outer race 20, extending toward the side panel 12 of the inner race 10. A curved surface 431 is defined between the stop lip 42 and the protruding lip 43.

Further, to achieve the preferable dust protective effect, a lubricating grease A is applied to the area between the curved surface 342 and the curved surface 431, between the back surface 313 of the main lip 31 and the inner race face 211 of the face panel 21, and between a surface of the front lip 32 and the inner surface 221 of the front blocking panel 22. As shown in FIG. 3, an annular oil passage B is defined between the inner race 10 and the outer race 20 of the sealing device 100. The main lip 31 is stretched by the compression spring 36 to force the ridge 311 to contact against the face panel 21 of the outer race 20, thereby causing the ridge 311 to deform.

Figure 7:
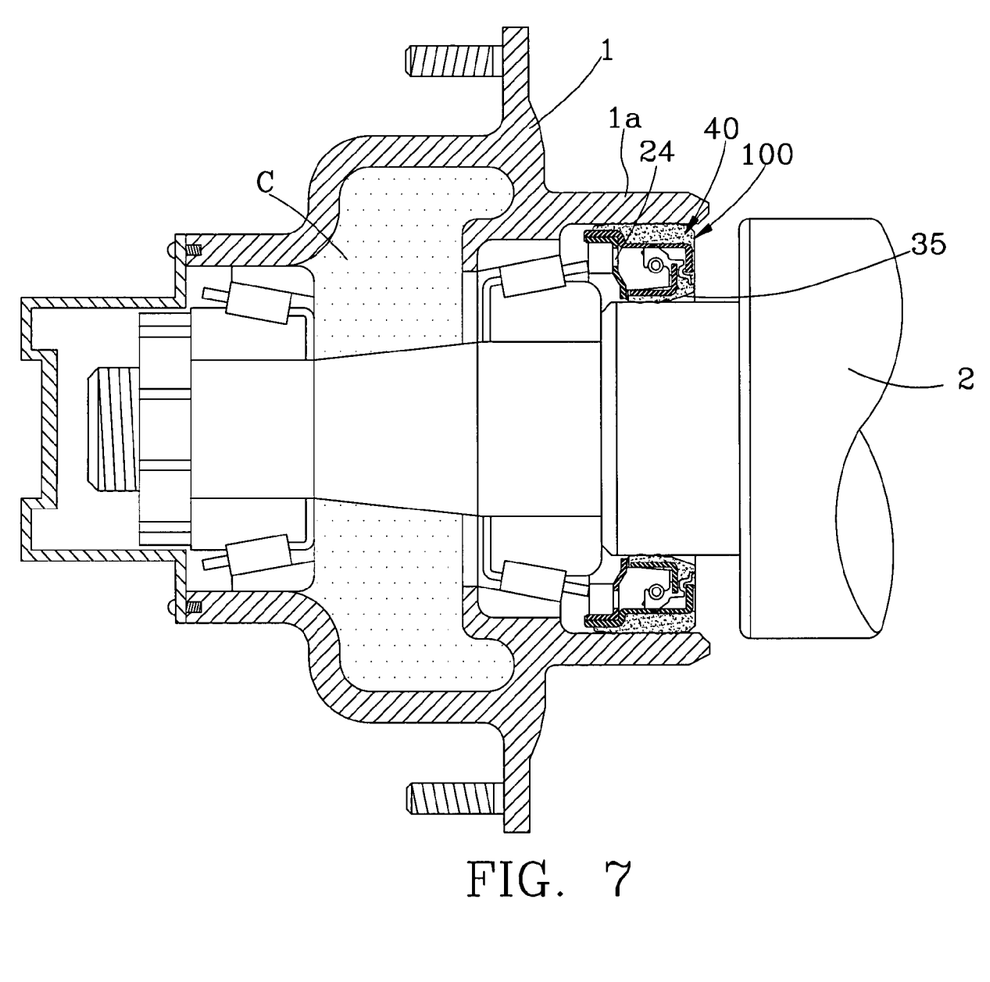
FIG. 7 is a sectional view of the preferred embodiment of the present invention applied to an object.

When the present invention is in use, the sealing device 100 is mounted between a shaft and a rotary member that is concentric to the shaft. FIG. 7 shows an application example of the present invention. As illustrated, the sealing device 100 is mounted between one wheel hub 1 of a motor vehicle, like a truck or a bus, and the corresponding shaft 2. The wheel hub 1 has a lubricating oil C filled therein. The sealing device 100 is set at a back side of the wheel hub 1, keeping the radiation holes 24 in alignment with the wheel hub 1, the base sealing layer 41 attached to the inner surface of a rear sidewall 1a of the wheel hub 1, and the base sealing layer 35 of the inner oil seal 30 attached to the surface of the shaft 2. When installed, the sealing device 100 prevents leakage of the lubricating oil C and seals the wheel hub 1 against outside dust.

In the aforesaid application example, the lubricating oil C flows into the oil passage B inside the sealing device 100. During running of the motor vehicle, the outer race 20 is rotated along with the wheel hub 1 relatively to the inner race 30 at the shaft 2. At this time, due to the ribs 316, the lubricating oil C flows through the radiation holes 24 between the annular oil passage B where the temperature is relatively high and the wheel hub 1 where the temperature is relatively low, thereby lowering the temperature in the annular oil passage B and prolonging the service life of the sealing device 100.

As indicated above, the present invention has the following advantages:

1. The design of the convex surface 316a and the tangent surface 316b of each rib 316 causes the lubricating oil C to flow spirally to enhance the convection of the lubricating oil C between the annular oil passage B and the wheel hub 1, thereby reducing the adverse impact of oil temperature on the rubber material of the sealing device 100.

2. The structure of the double-bevel ribs 317 and the oil grooves 318 of the back surface 313 of the main lip 31 confines the lubricating oil leaking out of the annular oil passage B to the oil grooves 318. In addition, the double-bevel ribs 317 pushes the oil film running out of the oil grooves 318 back to the annular oil passage B upon relative rotation between the inner race 10 and the outer race 20.

3. The curved space, which is defined by the curved surface 342 and the curved surface 431, and the lubricating grease A located in such curved space effectively protect the annular oil passage B against outside dust and lower the temperature of the annular oil passage B.

4. Because the stop lip 42 extends radially inwards, it will be compressed to reduce the curved surface 342 and the curved surface 431 while being stained with a certain amount of dust, thereby effectively blocking the dust.

5. The lubricating grease A protects the sealing device 100 against outside dust and reduces the probability of the occurrence of high temperature incurred by friction resistance from the corresponding area.

6. The raised portions 321 of the front lip 32 are covered with the lubricating grease A to reduce friction resistance.

Figure 8:
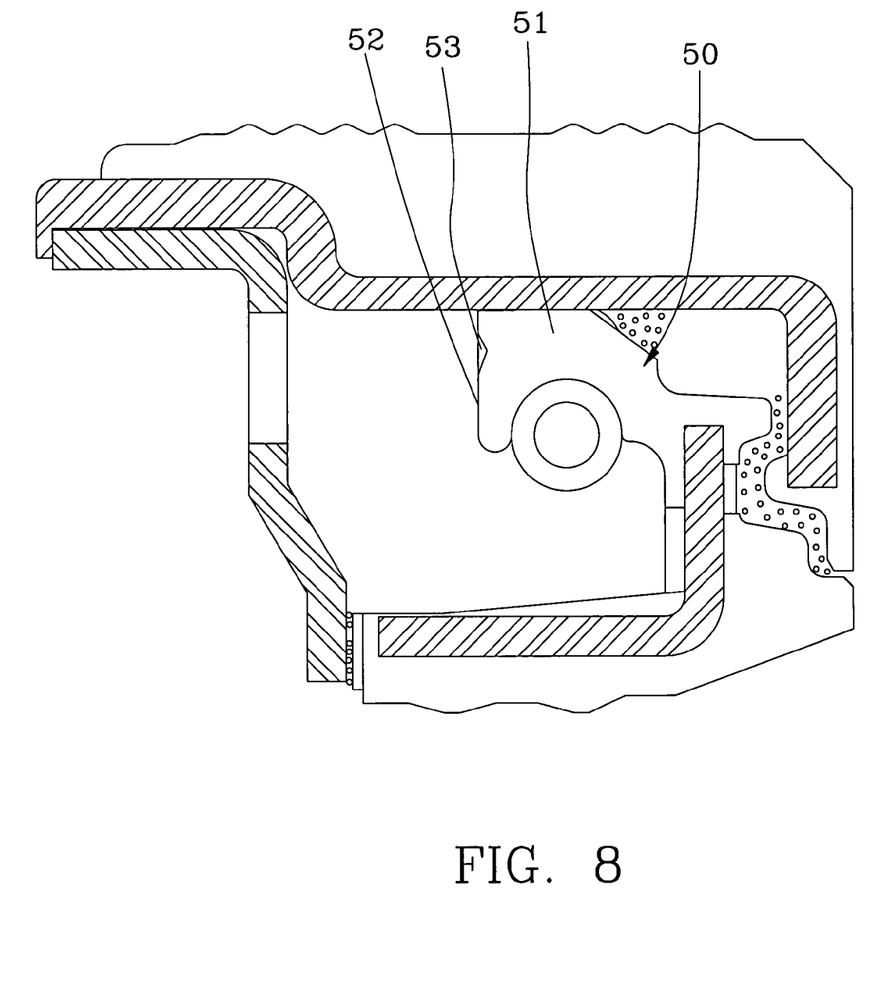
FIG. 8 is similar to FIG. 3, showing that the spoiler is formed of grooves on the inner oil seal.
Figure 9:
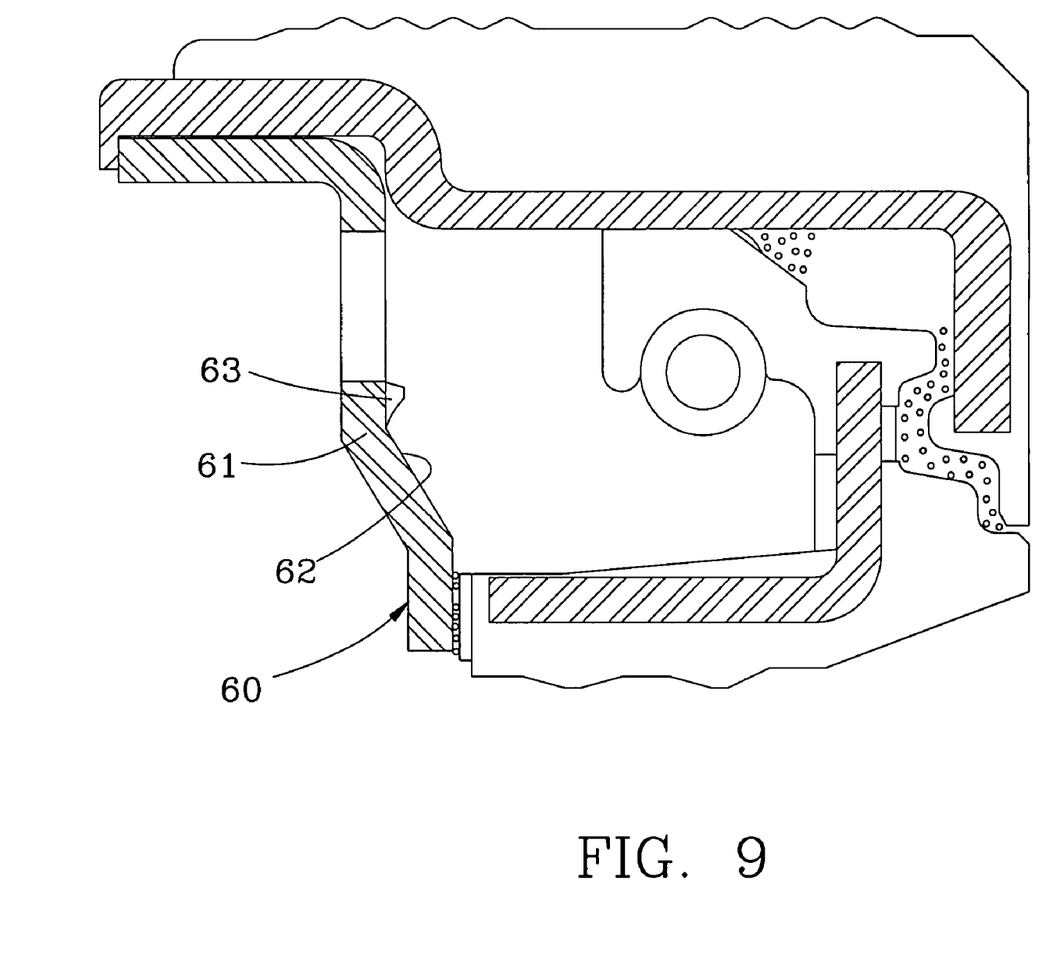
FIG. 9 is similar to FIG. 3, showing that the spoiler is formed of ribs on the outer race.
Figure 10:
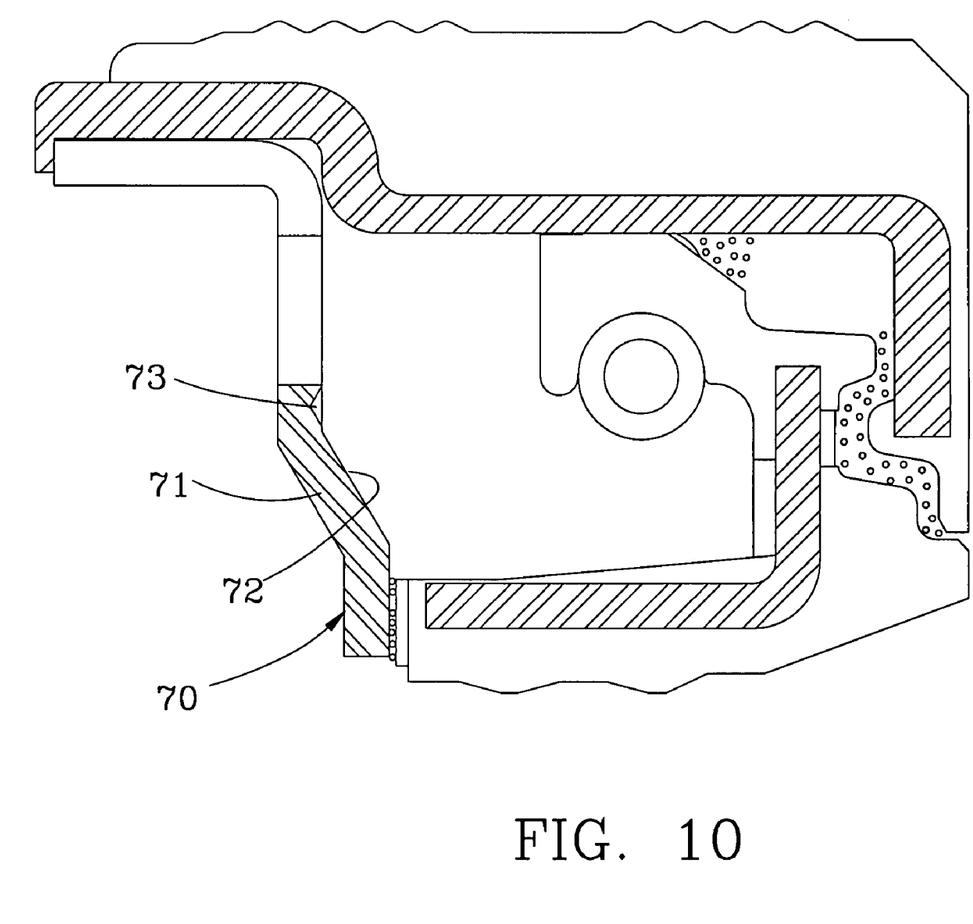
FIG. 10 is similar to FIG. 3, showing that the spoiler is formed of grooves on the outer race.

Further, the spoiler for causing the convection of the lubricating oil C in the annular oil passage B can be alternatively embodied as other spoiler structure. In the embodiment shown in FIG. 8, the spoiler structure includes a plurality of grooves 53 spaced from one another at the front surface 52 of the main lip 51 of the inner oil seal 50. In the embodiment shown in FIG. 9, the spoiler structure includes a plurality of narrow elongated ribs 63 protruded from the inner surface 62 of the front blocking panel 61 of the outer race 60 and annularly arranged. In the embodiment shown in FIG. 10, the spoiler structure includes a plurality of grooves 73 formed on the inner surface 72 of the front blocking panel 71 of the outer race 70 and annularly arranged.

What is claimed is:

1. A sealing device comprising:

an inner race being a circular frame having a top race face and a bottom race face;

an outer race capped on said inner race and rotatable relatively to said inner race, said outer race being a circular frame having an inner race face, an outer race face, a front blocking panel, a rear blocking panel, and two inner surfaces;

an inner oil seal mounted to said inner race and having a front lip, a rear lip, an extension lip, and a main lip, said main lip having a ridge, a front surface, and a back surface, said inner oil seal being forced by a radial pressure to press said ridge against the inner race face of said outer race;

an oil passage defined among said top race face of said inner race, said inner race face of said outer race, one of said inner surfaces of said outer race, and said inner oil seal for receiving oil inside;

a spoiler formed on said front surface of said main lip of said inner oil seal and facing said oil passage for causing convection of said oil while said outer race is rotated relatively to said inner race;

wherein said outer race has a plurality of radiation holes in communication with said oil passage and the outside of said outer race an outer oil seal, having a protruding lip and a stop lip, attached to a free end of the rear blocking panel of said outer race and extending radially inwards;

a first curved surface defined between the rear lip and the extension lip and a second curved surface defined between the stop lip and the protruding lip, the first and second curved surfaces defining an area therebetween; and lubricating grease applied to the area between the first and second curved surfaces and between a surface of the front lip and the front blocking panel of the outer race.

2. The sealing device as defined in claim 1, wherein said inner race comprises a face panel and a side panel; said top race face and said bottom race face is located on said face panel; said outer race comprises a face panel, said front blocking panel and said rear blocking panel being disposed respectively at bilateral sides of said face panel of said outer race, said front blocking panel having a free end extending radially inwardly from said face panel of said outer race; said inner race face and said outer race face are located on said face panel of said outer race, each of said front blocking panel and said rear blocking panel having an inner side facing each other and forming said inner surface and an outer side forming an outer surface; said radiation holes run through the inner and outer surfaces of said front blocking panel; said main lip of said inner oil seal comprises a spring groove formed at a side thereof opposite to said ridge, said spring groove holding a compression spring that generates said pressure to said main lip to further force said ridge to contact against said inner race face of said outer race.

3. The sealing device as defined in claim 2, wherein said side panel of said inner race is spaced from said rear blocking panel of said outer race at a distance; the extension lip extending toward said rear blocking panel of said outer race.

4. The sealing device as defined in claim 3, wherein said main lip further comprises a plurality of double-bevel ribs protruded from a rear surface thereof, said double-bevel ribs each having an end adjacent to said ridge.

5. The sealing device as defined in claim 4, wherein said outer oil seal comprises an outer base sealing layer attached to the outer race face of said outer race, and said inner oil seal has an inner base sealing layer attached to the bottom race face of said inner race.

6. The sealing device as defined in claim 5, wherein said spoiler is formed of a plurality of narrow ribs spaced from one another.

7. The sealing device as defined in claim 6, wherein said narrow ribs of said spoiler each comprise a convex surface and a tangent surface, said tangent surface being relative to the front surface of said main lip at an angle.

* * * * *